United States Patent Office 3,406,133
Patented Oct. 15, 1968

3,406,133
FLOOR POLISH COMPOSITION
Jack Henry Hartshorn, Springfield, Pa., assignor to E. I. du Pont de Nemours and Company, Wilmington, Del., a corporation of Delaware
No Drawing. Filed Oct. 30, 1964, Ser. No. 407,871
9 Claims. (Cl. 260—28.5)

ABSTRACT OF THE DISCLOSURE

This invention comprises an aqueous emulsion floor polish having 5 to 30 parts by weight of leveling resins, 5–60 parts by weight waxes, and 35–90 parts by weight of a terpolymer of (a) a conjugated diene (b) an $\alpha,\beta$-unsaturated carboxylic acid containing 3–9 carbon atoms and (c) a monomeric composition consisting essentially of at least 50% of a lower alkyl ester of a $C_3$ to $C_9$ $\alpha,\beta$-unsaturated carboxylic acid. The weight proportions of (a), (b) and (c) are in the percentage ranges of 4–49, 1–15, and 36–95, respectively. These emulsions provide floor polishes which form nonyellowing high gloss films with excellent mar and scuff resistance properties.

---

This invention concerns an aqueous emulsion polish composition and more particularly a polish composition having improved durability and color characteristics.

Many types of floor polishing compositions are known including those that require buffing and those that dry to a bright luster without buffing. Of the former types are the well known wax compositions generally containing large proportions of expensive carnauba wax. The polishes in the latter category, known as dry-bright polishes, are generally available as aqueous emulsions of waxes and certain polymeric materials. Several polymeric materials have been used in emulsion polishes, the most common among these being polystyrene. Polystyrene emulsion polishes, while producing a hard surface, show little resistance to "pock" marking by high heels and demonstrate appreciable yellowing on aging and significant discoloration on successive polish applications. Other common floor polish compositions, such as mixtures of acrylic polymers are quite soft, thus readily picking up dirt and rubber heel marks.

According to the present invention, there is provided in an aqueous emulsion floor polish comprising 5–30 parts by weight levelling resins and 5–60 parts by weight waxes, the improvement, in combination therewith, comprising essentially 35–90 parts by weight of a terpolymer of (a) a conjugated diene represented by the structural formula,

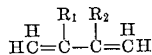

wherein $R_1$ and $R_2$ are individually hydrogen, chlorine, fluorine, or lower alkyl groups, (b) an $\alpha,\beta$-unsaturated carboxylic acid containing from three to nine carbon atoms, and (c) a monomeric composition consisting essentially of at least fifty percent of a lower alkyl ester of a $C_3$ to $C_9$ $\alpha,\beta$-unsaturated carboxylic acid. The portions (a), (b), and (c) are in the weight percentage ranges of 4–49, 1–15, and 36–95, respectively, the terpolymer being in the form of a latex with a maximum particle size of 0.2 micron in diameter. The emulsion polish of this invention when applied to floors, such as linoleum, asphalt, vinyl asbestos, or vinyl and rubber, yields a hard, non-yellowing high gloss film with excellent mar and scuff resistant properties. In addition, the polish may be removed, for rewaxing, or additional wax may be applied without the heretofore characteristic yellowing.

Due to their easy availability, the preferred conjugated dienes of the terpolymer are 1,3-butadiene, isoprene, and chloroprene. Other useful conjugated dienes are 2,3-dichloro-1,3-butadiene, fluoroprene, 2,3-difluoro-1,3-butadiene, 2,3-dimethyl-1,3-butadiene, 1,3-butadienes with lower alkyl groups substituted on one or both of the 2,3-carbon atoms. As used in this invention the term lower alkyl group refers to alkyl groups containing less than about seven carbon atoms (i.e., about 1–6 carbon atoms). The lower alkyl groups can be the straight chain alkyl groups, such as methyl, ethyl, propyl, pentyl, hexyl and in addition, all branched isomers thereof (e.g., isopropyl, sec. butyl, tert. butyl, neopentyl, etc.).

The preferred $\alpha,\beta$-unsaturated carboxylic acids utilized to form the terpolymer of this invention are acrylic acid and methacrylic acid. Additional useful acids are those having the structure:

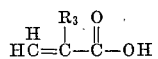

where $R_3$ is a lower alkyl group. Such acids as ethyl acrylic acid, propyl acrylic acid, butyl acrylic acid, etc. can be used.

The lower alkyl ester used in preparing the terpolymer of this invention can be formed from any of the carboxylic acids set forth in the previous paragraph. Useful esters are those having the structure:

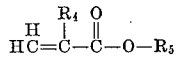

where $R_4$ is hydrogen or a lower alkyl group and $R_5$ is a lower alkyl group. The acid component of the ester is not dependent upon the carboxylic acid used in the terpolymer; thus, methyl methacrylate can be the lower alkyl ester while acrylic acid is the $\alpha,\beta$-unsaturated carboxylic acid. The lower alkyl methacrylates and lower alkyl acrylates, such as methyl acrylate, methyl methacrylate, ethyl acrylate, ethyl methacrylate, etc., are the preferred esters.

Though this invention concerns a terpolymer prepared from the above monomers, namely, (a) a conjugated diene, (b) an $\alpha,\beta$-unsaturated carboxylic acid, and (c) a lower alkyl ester, a vinyl unsaturated monomer can replace up to fifty percent of the lower alkyl ester (c). Thus, it is to be understood that the monomeric composition (c), usually referred to as the ester composition, can contain up to fifty percent of other compounds, such as acrylonitrile, styrene, substituted styrenes, vinyl ethers, vinyl alcohols, vinyl esters and lower alkyl derivatives of these compounds.

Generally, the weight percentage ranges of diene, acid, and ester are 4–49, 1–15, and 36–95, respectively, but the preferred ranges will vary with the particular diene used. Representative examples of terpolymer weight percentage ranges are:

|  | Preferred Range | Most Useful |
|---|---|---|
| Butadiene Base: |  |  |
| 1,3-butadiene | 4–35 | 11–20 |
| Methacrylic acid | 2–10 | 3–7 |
| Methyl methacrylate | 55–94 | 73–86 |
| Chloroprene Base: |  |  |
| Chloroprene | 9–45 | 17–30 |
| Methacrylic acid | 2–10 | 3–7 |
| Methy methacrylate | 45–89 | 63–80 |
| Isoprene Base: |  |  |
| Isoprene | 7–40 | 13–25 |
| Methacrylic acid | 2–10 | 3–7 |
| Methyl methacrylate | 50–91 | 68–84 |

The terpolymer latex can be formulated by any aqueous emulsion polymerization technique. These techniques in which the monomers are dispersed in water with anionic or a combination of anionic and nonionic surfactants and free radical catalysts are well known in the art. The polymerization which is believed to go to about completion is accomplished at a temperature ranging from below room temperature to the boiling point of water and a pressure of up to 100 lbs./sq. in. A thorough discussion of useful emulsion polymerization processes can be found in the book Emulsion Polymerization by F. A. Bovey, I. M. Kolthoff, A. I. Medalia, and E. J. Meehan, published by Interscience Publishers in 1955.

In formulating the terpolymer latex, polymerization conditions are controlled to provide a polymer average particle size that does not exceed two-tenths of a micron in diameter, all particles being considered practically spherical. Larger average particle sizes will result in polishes with rough surfaces and milky appearances. For best results, the particle size is maintained at less than one-tenth of a micron in diameter and the particles are of uniform size.

To formulate the floor polish composition of this invention, a terpolymer latex of this invention is combined with conventional floor polish components. The term conventional floor polish components as employed herein means any of those components known in the art and used as major components in floor polish compositions. This includes mixtures of "levelling resins" and waxes, and optionally as minor additions, compounds serving as coalescing aids, plasticizers, surfactants, and such other materials as will improve esthetic, preservative, or application properties.

In a floor polish composition alkali soluble "levelling resins" are used. Examples of some of the more common of these are: (a) high acid number rosins, rosin maleate adducts, and their esters; (b) high acid number phenolics and their esters; (c) shellac and modifications thereof; (d) styrene maleic copolymers and their esters; and (e) high acid number polyesters. In particular, a pale, high melting alkali soluble resin called "Shanco L-1177," made by Shanco Plastics and Chemical, Inc., can be used effectively. This "levelling resin" is characterized by a melting point (R. & B.) of 173-183° C., an acid number of 185-195, and an ammonia requirement (28%) of about 25% based on the resin.

Waxy materials, another preponderant ingredient of conventional floor polish compositions, usually comprise natural or synthetic waxes or blends thereof. Examples of useful, natural waxes are carnauba, sugar cane, bees wax, and montan. Synthetic waxes, such as microcrystalline paraffin and polyethylene can be used. The polyethylene wax can be oxidized, unoxidized, or emulsion polymerized, suitable examples of which are Allied Chemical's #629 polyethylene or "PolyEm" of Spencer Chemical. For addition to floor polishes, these waxes are dispersed in water with surface active agents, such as sorbitol condensate adducts, polyglycol ether products, alkali or amine salts of fatty acids, sulfates, and sulfonates.

Optional minor ingredients in floor polish compositions include coalescing aids, plasticizers, and surface active agents. Common coalescing aids are high boiling alcohols and their ethers, such as ethylene glycol, diethylene glycol, and "Carbitol." Plasticizers commonly employed are the alkyl phosphates and phthalates, particularly tributoxyethyl phosphate and dibutyl phthalate. Anionic surfactants, such as sodium lauryl sulfate and morpholine oleate and nonionic surfactants, such as sorbitol condensates and polyethylene oxide adducts are also commonly added in the conventional floor polish composition. In addition, fluorocarbon surface active agents, as set forth in United States Patent 2,937,098, can be used.

The polish composition of the present invention is prepared by diluting the major ingredients of the composition, namely the terpolymer latex, levelling resin, and wax to about the same solids level and mixing. In the resulting composition, the weight ratios of the solids are generally in the proportion of 35-90 parts terpolymer, 5-30 parts levelling resin, and 5-60 parts wax. The most useful ratio is dependent upon the particular major ingredients included as can be seen in Examples I-IV. Other optional constituents of conventional polishes can be admixed therewith, with or without prior dilution, as desired. It is customary to dilute the compositions to a solids concentration of 5% to 30% by weight. The preferred solids concentration range for producing good results, ease of application, and low cost is 10% to 20% by weight. Conveniently, the terpolymer latex is diluted directly with water to the desired solids level, but, the levelling resin is commonly dissolved in an aqueous alkali solution, such as ammonia, and the wax, as stated before, is dispersed in water with a surfactant.

Tests were conducted comparing the floor polish composition of this invention with commercially available household floor polishes. However, it is to be understood that the floor polish of this invention is not limited to use on household floors, and can be used on other flooring, such as industrial. In the following tables, Compositions A and B refer to polishes of the present invention, as given in Examples I and II below, containing 1,3-butadiene, methacrylic acid, and methylmethacrylate diluted to 15 and 18 percent solids, respectively. Compositions C, D, and E represent commercially available household floor polishes; C being a predominantly acrylic polish, D being a predominantly polystyrene polish, and E being a styrene-acrylic polish.

The yellowness index test determines the tendency of a floor polish to discolor or turn yellow on successive polish applications. The test procedure is to dip coat for 30 seconds, No. 4 whatman filter papers in the test polishes and allow them to dry at 77° F. and 50% relative humidity for at least three hours. The yellowness index is determined on a modified Gonio multipurpose photometer by obtaining reflectance values on the treated papers employing three different optical filters and using the following formula:

$$\text{Yellowness index} = \frac{\text{Reflectance (amber)} - \text{reflectance (blue)}}{\text{Reflectance (green)}} \times 100$$

Higher yellowness index values indicate greater degrees of yellowness. Table I presents the results of these tests.

TABLE I.—YELLOWNESS INDEX TEST

| Floor Polish Composition | A | B | C | D | E |
|---|---|---|---|---|---|
| Index on 2 coats | 3.6 | 5.1 | 10.2 | 12.5 | 11.9 |
| Index on 4 coats | 5.6 | 7.0 | 11.9 | 15.3 | 15.1 |

Low temperature flexibility tests were conducted to compare resistance of the polishes to permanent deformation. Greater flexibility indicates higher resistance to permanent deformation, such as "pock marks" inflicted by high heels. In this test 0.2 mil of polish is spread over a 2" by 4" area of homogeneous vinyl tile by means of a doctor blade applicator and allowed to dry. The test panel is conditioned at approximately 40° F. for a minimum of three hours and is then inwardly bent around a 1" diameter mandrel which has similarly been cold conditioned. The panels are rated for comparative lack of cracking or crazing in the film or actual separation of the film from the panel. Table II presents the results of these tests:

TABLE II.—LOW TEMPERATURE FLEXIBILITY TESTS

| Floor Polish Composition | A | B | C | D | E |
|---|---|---|---|---|---|
| Flexibility | Excellent (2) | Excellent (1) | Excellent (2) | Poor (Film Separation) | Fair-Good (Severe Cracking) |

NOTE.—Numbers (in parentheses) indicate order of preference where two or more products are rated the same. (1 being preferred over 2).

Heel mark resistance tests were conducted by randomly tumbling rubber heels onto 9" by 9" standard floor tile panels in a soil capsule developed by Foster D. Snell, Inc. The soil capsule is a box with the test panels strapped to the insides. The rubber heels are placed inside the capsule and the capsule is rotated for several minutes inside the capsule and the capsule is rotated for several minutes after which the panels are examined. The method of this test is more clearly set forth in a paper titled A Method for Evaluating Heel Mark Resistance by B. Berkeley and W. J. Hackett, published in the Proceedings of the 50th Mid-Year Meeting of the Specialty Manufactures Association, May 1964, Chicago, Ill. The ratings obtained in this test are presented in Table III:

TABLE III.—HEEL MARK RESISTANCE TEST

| Floor Polish Composition | A | B | C | D | E |
|---|---|---|---|---|---|
| Official Test—Asphalt | V. Good (2) | Excellent (1) | V. Good (1) | Good | Excellent (2). |
| Official Test—Vinyl Asbestos | | Excellent | Good | Fair-Good | V. Good (1). |

NOTE.—Numbers (in parentheses) indicate order of preference where two or more products are rated the same. (1 being preferred over 2).

The following Examples I through IV illustrate the floor polish compositions of this invention. All quantities of terpolymers, levelling resin, and wax are on a parts by weight basic of solids plus diluent. The ingredients as set forth in the examples are cold blended by conventional mixing means to form the polish composition.

EXAMPLE I

Dispersion or solution, parts
Terpolymer latex (aqueous emulsion 15% solids):
15% 1,3-butadiene, 5% methacrylic acid, 80% methylmethacrylate _____ 75
Levelling resin: "Shanco L-1177" (aqueous ammonia-15% resin) _____ 15
Wax: "PolyEm-10" (emulsion polymerized 15% solids) _____ 10
"Carbitol" solvent _____ 2.0
Plasticizer (tributoxyethyl phosphate) _____ 0.3
n-Octanol solvent _____ 0.1

The composition of Example I is represented by (A) in Tables I through III presented above.

EXAMPLE II

Dispersion or solution, parts
Telpolymer latex (aqueous emulsion 18% solids):
15% 1,3-butadiene, 5% methacrylic acid, 80% methylmethacrylate _____ 70
Levelling resin: "Shanco L-1177" (aqueous ammonia-18% resin) _____ 15
Wax: "PolyEm-10" (emulsion polymerized 18% solids) _____ 15
"Carbitol" solvent _____ 2
Plasticizer (tributoxyethyl phosphate) _____ 0.5

The composition of Example II is represented by (B) in Tables I through III presented above.

EXAMPLE III

Dispersion or solution, parts
Terpolymer latex (aqueous emulsion 15% solids):
27.5% chloroprene, 5.0% methacrylic acid, 67.5% methylmethacrylate _____ 75
Levelling resin: "Shanco L-1177" (aqueous ammonia-15% resin) _____ 15
Wax: "PolyEm-10" (emulsion polymerized 15% solids) _____ 10
Plasticizer (tributoxyethyl phosphate) _____ 0.8
"Carbitol" solvent _____ 2.0

The resulting composition of Example III gives results comparable to those of the compositions given in Examples I and II with respect to the hardness tests and has a slight tendency to give a higher yellowness index value.

EXAMPLE IV

Dispersion or solution, parts
Terpolymer latex (aqueous emulsion 18% solids):
24% isoprene, 5% methacrylic acid, 71% methyl methacrylate _____ 70
Levelling resin: "Shanco-1177" (aqueous ammonia-18% resin) _____ 15
Wax: "PolyEm-10" (emulsion polymerized 18% solids) _____ 15
"Carbitol" solvent _____ 2
Plasticizer (tributoxyethyl phosphate) _____ 0.5

The resulting composition of Example IV has less of a tendency to yellow than any of the previous examples and maintains equivalent hardness to the other examples.

What is claimed is:

1. In an aqueous emulsion floor polish consisting essentially of 5–30 parts by weight levelling resins and 5–60 parts by weight waxes, the improvement, in combination therewith, consisting essentially of 35–90 parts by weight of a terpolymer of (a) a conjugated diene represented by the structural formula,

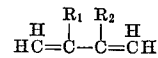

wherein $R_1$ and $R_2$ are selected individually from the group consisting of hydrogen, chlorine, fluorine, and lower alkyl groups, (b) an α,β-unsaturated carboxylic acid containing from three to nine carbon atoms, and (c) a monomeric composition consisting essentially of at least fifty percent of a lower alkyl ester of a $C_3$ to $C_9$ α,β-unsaturated carboxylic acid, wherein (a), (b), and (c) are in the weight percentage range of 4–49, 1–15, and 36–95, respectively, said terpolymer being in the form of a latex and having a maximum average particle size of less than 0.1 micron in diameter.

2. The aqueous emulsion polish of claim 1 in which (c) is a lower alkyl ester and wherein (b), the α,β-unsaturated carboxylic acid, and (c), the lower alkyl ester, have the structures:

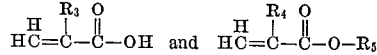

respectively, with $R_3$ and $R_4$ individually selected from the group consisting of hydrogen and lower alkyl groups and $R_5$ is a lower alkyl group.

3. The aqueous emulsion polish of claim 2, wherein the alkyl ester is selected from the group consisting of lower alkyl methacrylates and lower alkyl acrylates.

4. The aqueous emulsion polish of claim 2, wherein the α,β-unsaturated carboxylic acid is selected from the group consisting of acrylic acid and methacrylic acid.

5. The aqueous emulsion polish of claim 2, wherein the conjugated diene is selected from the group consisting of 1,3-butadiene, chloroprene, and isoprene.

6. The aqueous emulsion polish of claim 5, wherein the α,β-unsaturated carboxylic acid is selected from the group consisting of acrylic acid and methacrylic acid.

7. The aqueous emulsion polish of claim 6, wherein the alkyl ester is selected from the group consisting of lower alkyl methacrylates and lower alkyl acrylates.

8. The aqueous emulsion polish of claim 5, wherein the α,β-unsaturated carboxylic acid is methacrylic acid and the alkyl ester is methyl methacrylate.

9. The aqueous emulsion polish of claim 8, wherein the conjugated diene is 1,3-butadiene and the diene, acid and ester are in the weight percentage ranges of 4-35, 2-10, and 55-94, respectively.

References Cited

UNITED STATES PATENTS

| 3,202,627 | 8/1965 | Van Ess et al. | 260—80.7 |
| 3,234,158 | 2/1966 | Pflunger | 260—28.5 |
| 2,883,355 | 4/1959 | Balfe et al. | |

JULIUS FROME, *Primary Examiner.*

H. S. KAPLAN, *Assistant Examiner.*